(12) United States Patent
Mihashi

(10) Patent No.: US 6,516,963 B2
(45) Date of Patent: Feb. 11, 2003

(54) INJECTION BLOW MOLDED NURSING BOTTLE OF POLYETHERSULFONE

(75) Inventor: Hirokazu Mihashi, Kamcoka (JP)

(73) Assignee: Taisei Kako Co., Ltd., Osaka (JP)

( * ) Notice: Subject to any disclaimer, the term of this patent is extended or adjusted under 35 U.S.C. 154(b) by 0 days.

(21) Appl. No.: 09/740,319

(22) Filed: Dec. 18, 2000

(65) Prior Publication Data

US 2002/0108925 A1 Aug. 15, 2002

(51) Int. Cl.[7] .............................................. B65D 90/02
(52) U.S. Cl. ...................................... 215/373; 220/606
(58) Field of Search ........................ 215/373; 220/606; 264/40.3, 40.5, 296

(56) References Cited

U.S. PATENT DOCUMENTS

| | | | | |
|---|---|---|---|---|
| 3,511,401 A | * | 5/1970 | Lachner .................. 215/373 X |
| 3,718,229 A | * | 2/1973 | Wyeth et al. ............ 215/373 X |
| 3,720,339 A | * | 3/1973 | Khetani .................. 215/373 X |
| 3,811,588 A | * | 5/1974 | Vermeerbergen et al. ... 215/373 |
| 4,035,455 A | * | 7/1977 | Rosenkranz et al. ....... 264/40.3 |
| 4,334,627 A | * | 6/1982 | Krishnakumar et al. .... 215/373 |
| 4,387,815 A | * | 6/1983 | Jacobsen ................. 215/373 |
| 4,465,199 A | * | 8/1984 | Aoki ..................... 215/373 |
| 4,704,243 A | * | 11/1987 | Nilsson et al. ............ 264/521 |
| 4,785,948 A | * | 11/1988 | Strassheimer ............. 215/373 |
| 4,889,752 A | * | 12/1989 | Beck ..................... 215/373 X |
| 5,158,817 A | * | 10/1992 | Krishnakumar ............. 215/373 |
| 5,164,479 A | * | 11/1992 | Funaki et al. ......... 264/177.1 X |
| 5,217,737 A | * | 6/1993 | Gygax et al. ............... 426/111 |
| 5,357,014 A | * | 10/1994 | Uchida et al. .......... 264/291 X |
| 5,928,742 A | * | 7/1999 | Sugiura et al. ............ 428/35.7 |
| 5,989,661 A | * | 11/1999 | Krishnakumar et al. .... 215/382 |
| 6,176,382 B1 | * | 1/2001 | Rashid ...................... 215/373 |

OTHER PUBLICATIONS

Richardson et al., Industrial Plastics, Delmar Publisher, Inc., 1997, pp. 474–475.*

* cited by examiner

Primary Examiner—Nathan J. Newhouse
Assistant Examiner—Tri M. Mai
(74) Attorney, Agent, or Firm—Wood, Phillips, Katz, Clark & Mortimer (57) ABSTRACT

An object of the present invention is to improve shock resistance of nursing bottles formed of a PES resin so as to provide them with such a sufficient falling impact strength that they can be used pleasantly and safely. The injection-blow-molded PES nursing bottle of the present invention has a gate flash (6) at a central portion of a bottom (5), the flash being generated when the resin is previously injected to prepare a parison. The central bottom portion (5) is raised to be of a convex shape to bulge up towards a mouth of the bottle. A height 'h' of such a raised bottom portion is from 9% to 20% of an inner diameter 'R' that is possessed by a floor-engaging rim of the bottom, the rim being generally circular in a bottom plan view.

15 Claims, 6 Drawing Sheets

INJECTION BLOW MOLDED NURSING BOTTLE OF POLYETHERSULFONE

FIELD OF THE INVENTION

The present invention relates to an injection-blow-molded nursing bottle mainly formed of a polyether sulfone (viz., 'PES') resin.

BACKGROUND OF THE INVENTION

Nursing or feeding bottles made of plastics are often carried by users for use at any desired place, so that for assurance of safety to suckling babies, polycarbonate (viz., 'PC') resins highly resistant to shock have widely been employed as a material for forming those nursing bottles. The PC resins are transparent and, of such an excellent heat-resisting property that articles formed of them can be used within a wide range of temperatures, enabling the boiling of said articles for sterilization. Owing also to these further merits, the PC resins are particularly preferable materials of those nursing bottles. Each polycarbonate macromolecule comprises a main linear chain having therein ester groups (viz., —O—R—OCO—), so that glycols and/or any dibasic phenols have been used to react with phosgene or any carbonates. 'Bisphenol A' is a typical example of the dibasic phenols constituting the polycarbonates.

However, bisphenol A involved in the ordinary carbonates has recently been indicated as one of environmental hormones having a pseudoestrogenic effect. Recently, elution of bisphenol A (that is the environmental hormone) out of articles contacting foods, beverages or the like and made of polycarbonates has been reported to exceed an allowable limit.

Particularly, the industries manufacturing nursing bottles for suckling babies are concerned of the problem of environmental hormones. Therefore, urgent efforts have been made to seek an alternative material that will be comparable with polycarbonates in anti-shock property (viz., shock resistance) and heat resistance but nevertheless free from such a hormone problem.

Figure 6:
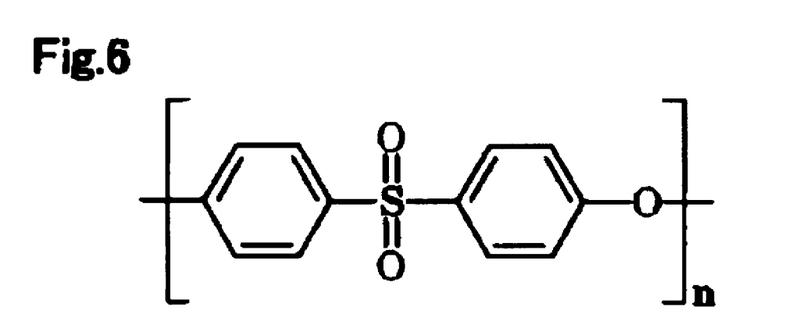
FIG. 6 is the chemical formula of a PES resin.

To meet this requirement, polyether sulfones (viz., 'PES') were proposed to substitute for polycarbonates. This resin is one of highly heat-resisting thermoplastic resins, and may be synthesized by polycondensation of dichlorodiphenyl sulphone whose chemical structure is shown in FIG. 6. molecular formula.

Generally speaking, a richer content of phenyl groups provides stiffer macromolecules highly resistant to heat. Polyether sulphone shown in FIG. 6 will be more heat-resisting than ordinary polysulphones. Those polyether sulphones lacking in alkyl groups are of an improved thermal stability and of a higher resistance to oxidation. They are relatively stiff and hard resins of a higher tenacity, having a specific gravity of 1.37, a tensile strength of 860 kgf/sq. cm, an breaking elongation of 40–80%, a bending strength 1320 kgf/sq. cm, a bending modulus of 26500 kgf/sq. cm, and a (Rockwell) hardness of M88.

Unfortunately, PES resins are considerably inferior to PC resins in anti-shock property. In any case, it may be possible to injection-blow-mold any selected PES resin into nursing bottles of the same shape as those which have been made of the PC resin. However, such PES nursing bottles have not proved sufficient in their anti-crash strength in the case of being occasionally dropped to fall onto hard floor, hard ground or the like, thus failing to be used practically.

An increased overall wall thickness may possibly be useful in improving strength. In a case of such resin nursing bottles each for instance of a capacity of about 300 milliliter or less, their bodies will have to be designed to weigh 40 grams or less taking into account productivity, gross weight of each bottle assembly and total manufacture cost. To satisfy these conditions, a maximum overall wall thickness of the bottles will be 1.5 mm, with a minimum of about 0.5 mm. The present inventors have conducted a series of falling tests on bottle samples prepared along this line, to find that PES nursing bottles of the prior art structure did not show any satisfactory anti-crash strength despite their wall thickness of 1.5 mm.

Accordingly, an object of the present invention is to provide an injection-blow-molded nursing bottle that is formed of a PES resin and having its bottom of such a specially modified configuration as affording a sufficient falling impact strength.

SUMMARY OF THE INVENTION

An injection-blow-molded nursing bottle provided herein and formed of a polyether sulfone resin is of a generally cylindrical shape and has a closed bottom, wherein the bottom having at a central portion thereof a gate flash generated when the resin is previously injected to prepare a parison, with the central portion being of a convex shape to bulge up towards a mouth of the bottle. A height of such a convex bottom is from 9% to 20%, and more preferably from 10% to 15% of an inner diameter that is possessed by of a generally circular floor-engaging rim of the bottom in a bottom plan view.

The injection-blow-molded PES nursing bottle may be produced by making at first the parison composed of the polyether sulfone resin and having a closed bottom, with use of an injection mold that has a gate at a location corresponding to the central portion of said bottom, and then stretching-blow molding the parison to form the bottle whose central portion is of a convex shape to bulge up or be curved upwards towards a mouth of the bottle. A height of such a convex bottom may be designed to be from 9% to 20%, and more preferably from 10% to 15% of an inner diameter that is possessed by of a generally circular floor-engaging rim of the bottom, in a bottom plan view thereof.

The term 'injection-blow molding' is meant to include various possible processes by which a parison is injected at first and it is subsequently blow molded. The so-called 'stretching-blow molding' process falls within this scope, which also includes the cold parison method and the hot parison method. In general, the parison is substantially of a cylindrical shape, and the material employed in the described molding process may contain any additives provided that its main ingredient is a PES.

Such a centrally-raised bottom of the bottle enables it in the invention to effect uniform stretch in all the directions and all around the rim or circular corner of said bottom. Thus improved are the shock resistance and the falling strength of the rim portion, conveniently to users of this nursing bottle. The bottom central portion protrudes towards the mouth a distance equal to or more than 9% of the inner diameter of said rim, that is an actually floor-engaging 'bottom'. Even if the nursing bottle containing any amount of milk would slip down to possibly result in damage or crash of the bottom rim due to gravitational shock, the bottom center having the gate flash will never collide with the floor. Residual stress resulting from the injection process and concentrated in such a bottom center will never initiate any instant and centrifugal spreading of breakage. It has been noted that an excessively raised bottom center had often caused a content (such as a breast milk or an artificial milk) to foam or bubble when being poured into the bottle. Also from a viewpoint of appearance and commercial value of the products, i.e., nursing bottles, their raised bottom centers have been restrained to be as low as possible. The bottle of the invention is of a sufficient falling impact strength notwithstanding usage of a PES resin as its material, and the convex bottom center raised by 20% or less avoids the foaming of bottle content and at the same time affords an unimpaired appearance.

In the stretching-blow-molding process, the PES parison will uniformly be heated at first to a temperature below its melting point but above its glass transition temperature (i.e., softening point), before stretching-blow molding the parison in a cold blow mold. This method provides regular orientation of PES molecules, ensuring transparency, mechanical strength and gas barrier property to the nursing bottle. The raised bottom center will contribute to a more uniform and non-directional stretching of the circular corner region of the bottom, and residual stress concentrated in and around the gate flash in the bottom center is diminished to enhance shock resistance of the bottle. The gate flash located in the raised bottom is protected from directly colliding with floor, ground or the like, thus preventing breakage from instantly spreading out from said gate flash.

The floor-engaging circular bottom portion may preferably be made flat and plane to come into a face contact in its entirety with the floor, to render stable such a standing position of the bottle. Alternatively, the bottom circular portion may be pointed in cross section, to be brought into a linear and annular contact with the floor.

THE PREFERRED EMBODIMENTS OF THE INVENTION

Now some embodiments of the invention will be described, referring to the drawings.

Figures 1A, 1B:
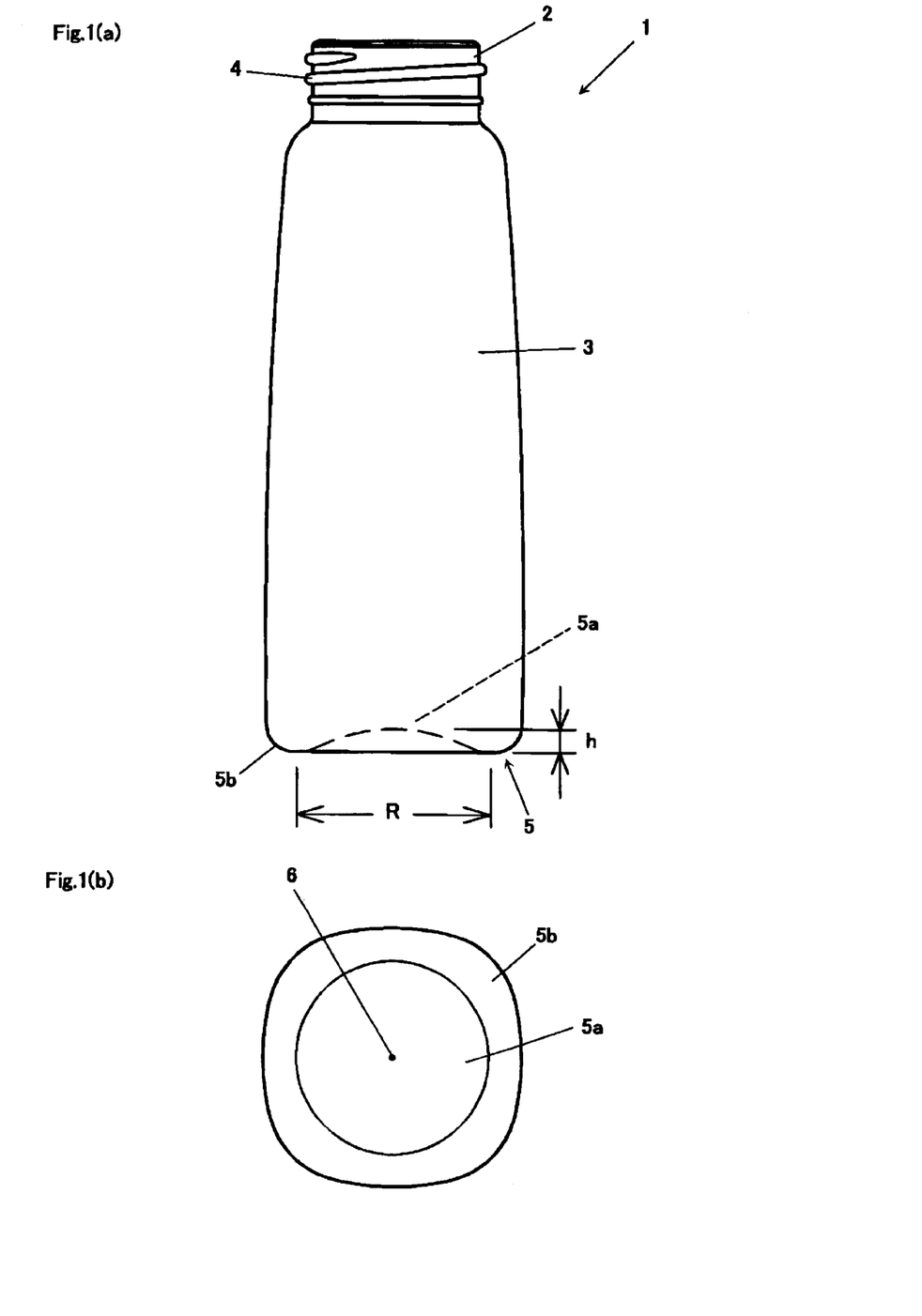
FIG. 1(a) is a front elevation of a nursing bottle provided in an embodiment of the present invention.
FIG. 1(b) is a bottom plan view of the nursing bottle.

FIG. 1 shows a nursing bottle provided in one of the preferable embodiments. This bottle 1 formed mainly of a polyether sulfone resin is generally of a cylindrical shape having an open top and a closed bottom. A mouth 2 located upward in the drawings continues downwardly to a barrel 3. This generally cylindrical mouth 2 has its outer periphery threaded at 4 to engage with and into a cap (not shown) having an integral nipple. The barrel 3 has a diameter larger than the mouth 2 and gradually towards the bottom. As seen in FIG. 1(b), the barrel has a non-circular, cross-sectional shape between the top and bottom of the barrel as viewed from the top of the barrel.

The bottle's bottom 5 (viz., bottom of barrel 3) is of a convex shape curved upwards to be partially spherical. A rim surrounding the convex central region 5a of the bottom is a ground-engaging surface (or portion) 5b to contact the ground or floor when the bottle stands on it. The center of the raised bottom portion 5a is made as a peak so that such a partially spherical raised portion operates to avoid any stress concentration. The raised bottom portion 5a has a surface that is continuously convexly curved opening in one direction over substantially the entire extent of an inner diameter 'R' of the surface 5b. A flash 6 protruding down from the center of bottom 5 and produced during manufacture of the nursing bottle does correspond to a gate of the mold for injection of a parison. A wall of substantially uniform thickness defines the barrel 3 and the bottom 5 of the bottle below the mouth 2.

The raised central region 5a of the bottom 5, which is substantially circular in shape, as viewed from the top of the barrel 3, as seen in FIG. 1(b), is of a height 'h' above the ground-engaging surface 5b, and this height may be from 9% to 20% of the inner diameter 'R' of the surface 5b. If the height 'h' is less than 9% of diameter 'R', then the bottle will not have a sufficient anti-shock property. However an excessively great height 'h' larger than 20% of diameter 'R' will not only impair the anti-shock property, but also produce an annular groove on the bottom and along its peripheral corner such that the bottle can not easily be cleaned to cause stagnation of milk residue. Therefore, a preferably range of such a 'ratio' is from 9–20%, and more desirably 10–15%.

As for practical dimensions of the nursing bottle 1, the height 'h' of the raised central region may preferably be more than 3.78 mm (for 9% as the ratio) but less than 8.4 mm (for 20% as the ratio) when the inner diameter 'R' is 42 mm. More preferably, the height may be more than 4.2 mm (for 10% as the ratio) but less than 6.3 mm (for 15% as the ratio).

Next, the step of injection-blow-molding will be described in one of the embodiments to manufacture nursing bottles 1 described above.

Preceding the step of blowing, a given amount of a pellet-shaped PES resin (and desired additives if needed) that is(are) preliminarily molten and kneaded will be injected at first into a cavity segment from a gate disposed in an injection mold so as to form a soft parison. This parison will then cooled down to solidify and give a hard parison having a closed bottom. That mold is incorporated in an injection molding apparatus (not shown), and that gate is located to face a central bottom portion of the parison so that the single gate enables uniform injection into and throughout the cavity segment. A mouth of the parison is formed using a lip segment.

Now, the step of blow molding will be described making reference to FIGS. 2 to 5. At first, a blow molding apparatus 12 used in the illustrated example comprises a mold 14 for defining a blow cavity segment 13, a stretching rod 15 and a means 16 for blowing compressed air into the parison 11. The blowing mold 14 is composed of split halves 17 and 18 that are arranged to take a right-hand position and a left-hand position, respectively, to be unfastened from each other (see FIG. 2) or fastened to each other (see FIG. 3). The mold further has a bottom segment 19 disposed below and between the split halves 17 and 18. This bottom segment 19 is generally columnar in shape in the illustrated example, and an upper surface thereof is of a convex shape to bulge up or be curved upwards towards its central portion to form the raised central region of the molded article 1.

A supporter 20 for receiving and holding in position the lip segment 10 are disposed on the split halves 17 and 18. A seat 21 is composed of a couple of mating halves for supporting the split halves, and those mating halves are to be driven sideways to fit on the periphery of the bottom segment 19.

The stretching rod 15 is positioned midway between the split halves 17 and 18 so as to extend coaxially with the bottom segment 19. A proper actuator (not shown) drives this rod 15 to reciprocate relative to the blow mold 14 and in axial direction of the blow cavity segment 13.

The blowing means 16 has a generally columnar blow core 22 that can fit in and be removed from the lip segment 10. An air outlet opening is formed in an inner end (viz., a lower end in the drawings) of the blow core 22. An air stream from a compressed air source, that is connected to the blow core, will dash into the parison 11. The stretching rod 15 can reciprocate up and down through an axial bore formed in the blow core 22.

The blow molding apparatus 12 is equipped with an appropriate means for cooling the blow molded article 1.

Figure 2:
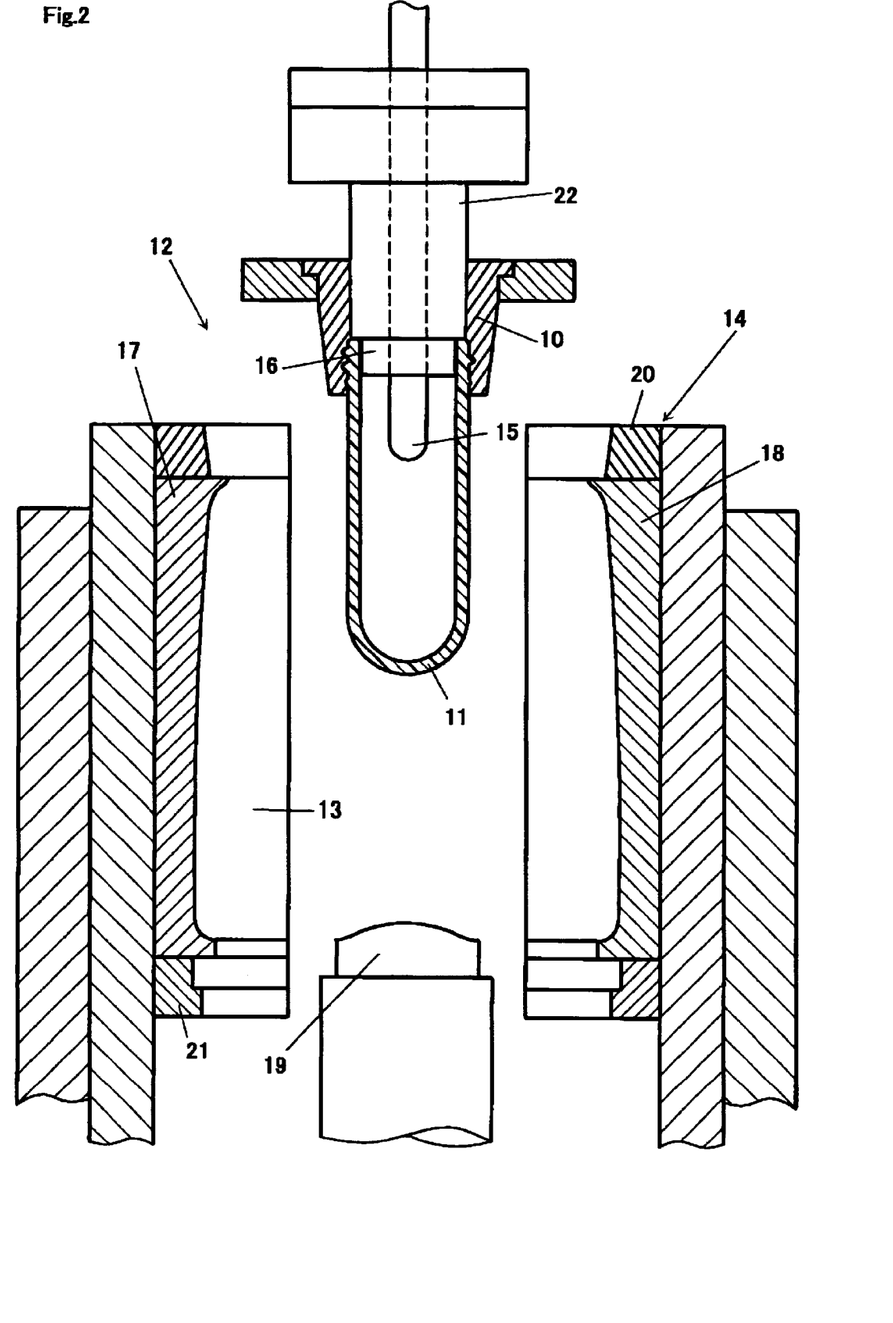
FIG. 2 is a fragmentary vertical cross section of a mold used in the blow molding of a parison, which is being inserted into the mold during manufacture of the nursing bottle.
Figure 3:
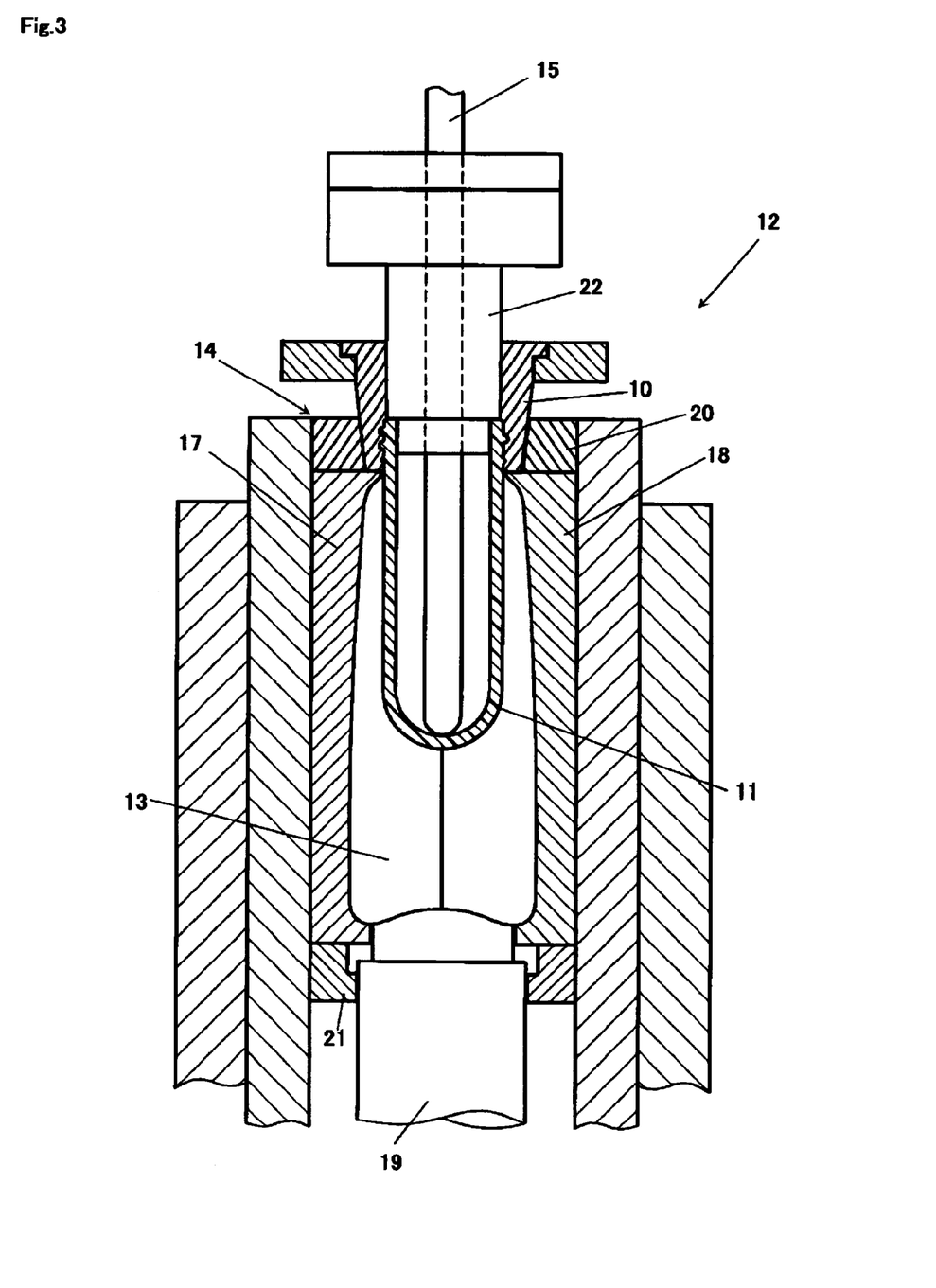
FIG. 3 is another fragmentary vertical cross section of the mold in which the parison has just been placed, during manufacture of the nursing bottle.

The parison 11 will be subjected to a biaxially-stretching-blow molding process, in the following manner. The blow mold 14 that has been open as shown in FIG. 2 will be closed at first as shown in FIG. 3 by fastening its halves together. The lip segment 10 holding the parison 11 will then be fitted in the supporter 20, to thus place the parison in the blow cavity 13 (see FIG. 3). The parison 11 has already been heated to or above its glass transition temperature but below its meting point, before placed in said cavity segment.

Figure 4:
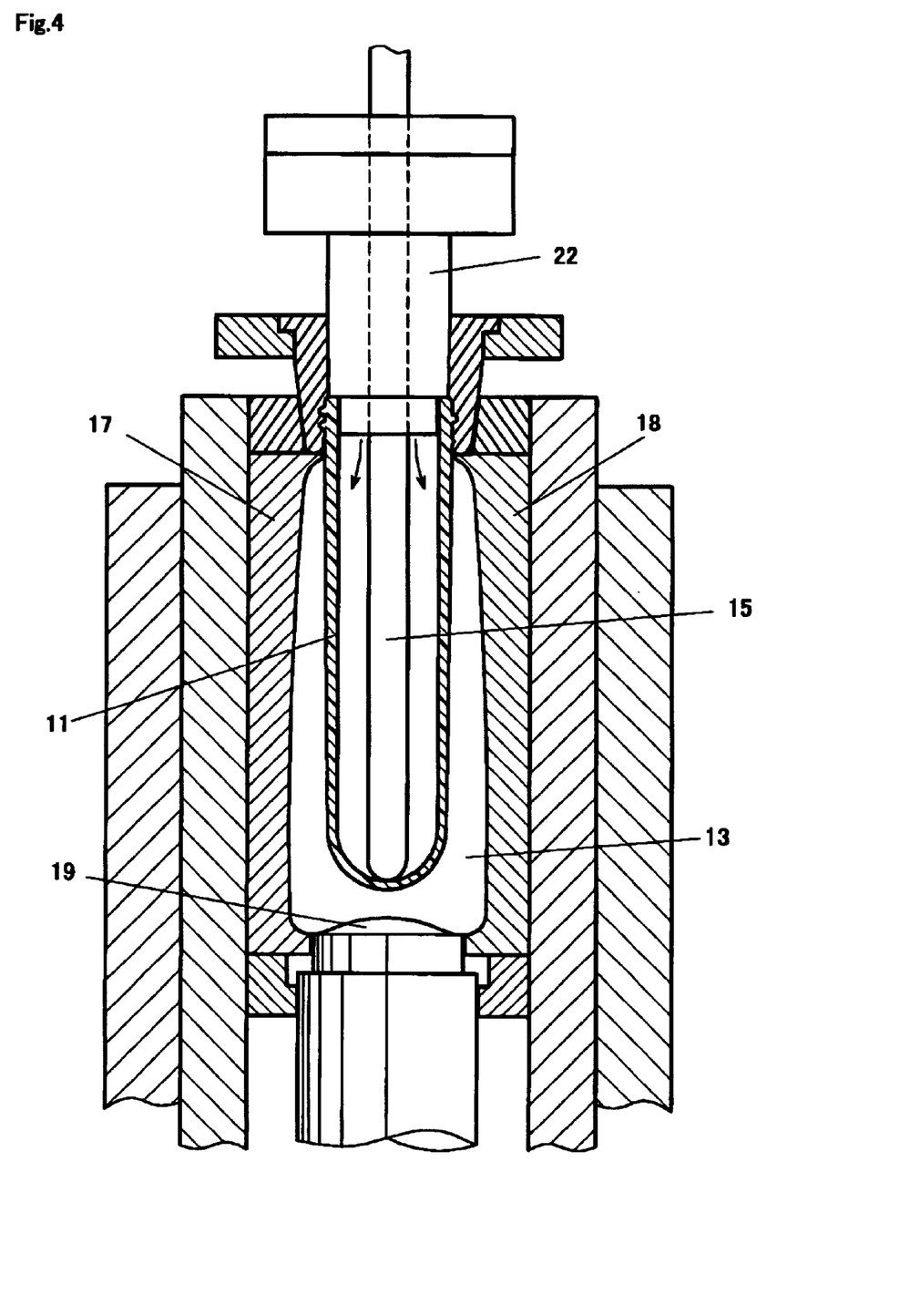
FIG. 4 is likewise a fragmentary vertical cross section that shows a stretching rod, which rod has just stretched the parison in a longitudinal or axial direction.
Figure 5:
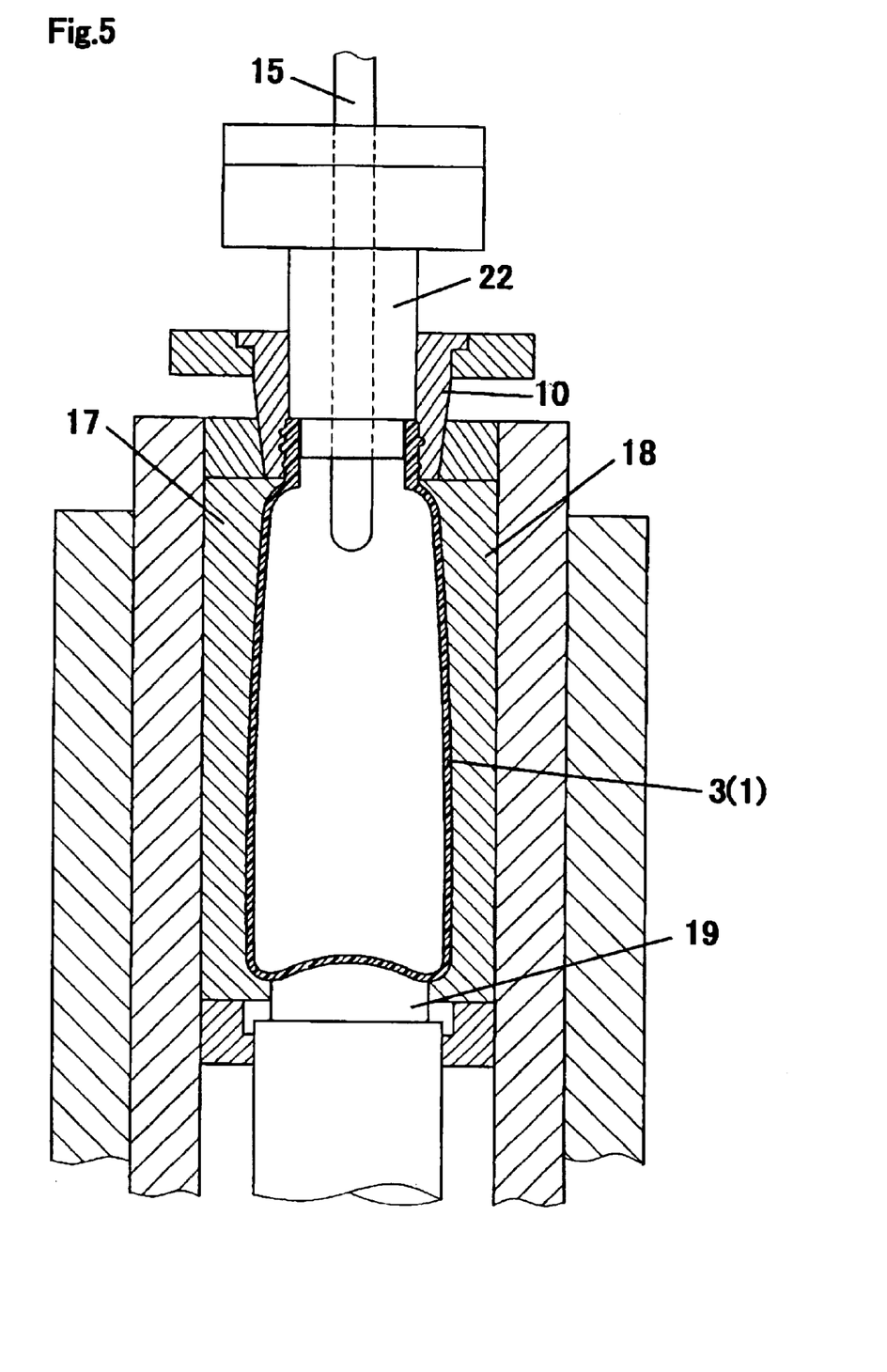
FIG. 5 is a further fragmentary vertical cross section of the mold, in which the parison has just been blow molded, also during manufacture of the nursing bottle.

Subsequently, the stretching rod 15 will be forced downwards to effect a preliminary or preceding longitudinal stretching of the parison 11 in a manner shown in FIG. 4. Thereafter, compressed air will be supplied to the interior of parison 11 through the outlet opening formed in the blow core's 22 inner end, so as to conduct the succeeding transverse stretching of parison. As a result, the nursing bottle 1 shown in FIG. 5 is provided as a finished blow molded article. During the latter step for transverse stretching, the partially-spherical upper surface of the convex bottom segment 19 does act to cause an annular corner region of the parison bottom to be stretched further in a longitudinal direction in harmony with the simultaneous transverse stretching. Thus, a higher degree of orientation of resin molecules will be afforded in the bottom corner region to improve anti-shock property (viz., shock resistance). Finally, the molded article 1 will be taken out of the blow mold 14, after cooled to solidify.

Some samples of the PES nursing bottle injection-blow-molded to be of the described structure were prepared, wherein height 'h' of the raised bottom was varied for the same inner diameter 'R'=46 mm of the ground-engaging portion. Falling impact strength was tested for these samples under the same condition, to give the following results:

| Height 'h' of Raised Bottom | Rating of Falling Impact Strength |
|---|---|
| 1.5 mm | not passed the test |
| 3.2 mm | not passed the test |
| 5.0 mm | passed the test |

These results apparently show that the two cases of the raised bottom having a height of 1.5 mm (corresponding to 3.26% of the inner diameter 'R' of the ground-engaging portion) and another height of 3.2 mm (corresponding to 6.96% of said diameter) did fail to satisfy the standard of falling impact strength. However, the other case wherein the raised bottom was of a height of 5.0 mm (corresponding to 10.9% of said diameter) showed a sufficient falling strength. The test results thus indicate that the injection-blow-molded PES nursing bottle of the present invention is improved in its shock resistance.

As described above, the present invention provides the nursing bottle having an improved shock resistance and enabling pleasant use thereof, despite use of a PES known as a resin that scarcely emits any environmental hormone. Accordingly, falling impact strength of the PES nursing bottle is now improved, even if the bottle has a wall thickness standard that has been established and employed in the industries manufacturing such kinds of the bottles. Highly valuable nursing bottles can now be produced to be available on market.

What is claimed is:

1. An injection-blow-molded resin nursing bottle having a barrel of a generally cylindrical shape and having a closed bottom, a top, a mouth, and a gate flash at a central portion of the bottom, the gate flash being generated when resin is previously injected to prepare a parison to form the nursing bottle, the barrel having a diameter that gradually increases from a location adjacent the mouth towards the bottom, the nursing bottle being formed mainly of a polyether sulfone (PES) resin, wherein the central bottom portion is raised to be of a convex shape bulging up towards the mouth of the bottle, and a height of the raised bottom portion is from 9% to less than 15% of an inner diameter that is possessed by a floor-engaging rim of the bottom, the rim being generally circular in a bottom plan view, the raised bottom portion having a substantially circular shape as viewed from the top of the barrel, the raised bottom portion having a first surface that is convexly curved opening in one direction over substantially the entire extent of the first surface over the inner diameter, the barrel having a non-circular cross-sectional shape between the top and bottom of the barrel as viewed from the top of the barrel.

2. An injection-blow-molded resin nursing bottle as defined in claim 1, wherein the floor-engaging circular bottom portion is made flat to come into a face contact in its entirety with a flat supporting floor.

3. An injection-blow-molded resin nursing bottle as defined in claim 1, wherein the height of the raised bottom portion is from 10% to less than 15% of the inner diameter of the floor-engaging rim.

4. The injection-blow-molded nursing bottle as defined in claim 1 wherein the first surface is continuously convexly curved in one direction over substantially the entire extent of the first surface over the inner diameter.

5. The injection-blow-molded nursing bottle as defined in claim 1 wherein the barrel is defined by a surrounding wall extending continuously to define the closed bottom and the surrounding wall has a substantially uniform thickness over substantially the entire extent of the surrounding wall.

6. An injection-blow-molded nursing bottle that is produced by the following method:

(a) preparing at first a parison composed primarily of a polyether sulfone resin and having a closed bottom, with use of an injection mold that has a gate at a location corresponding to a central portion of said bottom, and (b) then stretching-blow-molding the parison to form the nursing bottle having a barrel with a closed bottom, a top, and a mouth, wherein the bottom has a raised central portion of a convex shape to bulge up towards the mouth of the nursing bottle so that the raised central portion is of a height equal to 9% to less than 15% of an inner diameter that is possessed by a floor-engaging rim of the bottom, the barrel having a diameter that gradually increases from a location adjacent the mouth towards the bottom, the raised bottom portion having a first surface that is convexly curved opening in one direction over substantially the entire extent of the first surface over the inner diameter, the raised bottom portion having a substantially circular shape as viewed from the top of the barrel, the barrel having a non-circular cross-sectional shape between the top and bottom of the barrel as viewed from the top of the barrel.

7. An injection-blow-molded nursing bottle as defined in claim 6, wherein its floor-engaging rim is made flat to come into a face contact in its entirety with a flat supporting floor.

8. An injection-blow-molded nursing bottle as defined in claim 6, wherein the height of th raised central portion is from 10% to less than 15% of the inner diameter of the floor-engaging rim.

9. The injection-blow-molded nursing bottle as defined in claim 6 wherein the first surface is continuously convexly curved in one direction over substantially the entire extent of the first surface over the inner diameter.

10. The injection-blow-molded nursing bottle as defined in claim 6 wherein the barrel is defined by a surrounding wall extending continuously to define the closed bottom of the bottle and the surrounding wall has a substantially uniform thickness over substantially the entire extent of the surrounding wall.

11. An injection-blow-molded nursing bottle having a barrel of a generally cylindrical and having a closed bottom, a top, and a mouth, the barrel having a diameter that gradually increases from a location adjacent the mouth towards the bottom, the nursing bottle being formed mainly of a polyether sulfone (PES) resin, wherein the central bottom portion is raised to be of a convex shape bulging up towards the mouth of the bottle, and a height of the raised bottom portion is from 9% to less than 15% of an inner diameter that is possessed by a floor-engaging rim of the bottom, the rim being generally circular in a bottom plan view, the raised bottom portion having a substantially circular shape as viewed from the top of the barrel, the raised bottom portion having a first surface that is convexly curved opening in one direction over substantially the entire extent of the first surface over the inner diameter, the barrel having a non-circular cross-sectional shape between the top and bottom of the barrel as viewed from the top of the barrel.

12. The injection-blow-molded nursing bottle as defined in claim 7 wherein the first surface is continuously convexly curved in one direction over substantially the entire extent of the first surface over the inner diameter.

13. An injection-blow-molded nursing bottle as defined in claim 11 wherein the floor-engaging circular bottom portion is made flat to come into a face contact in its entirety with a flat supporting floor.

14. An injection-blow-molded nursing bottle as defined in claim 11, wherein the height of the raised bottom portion is from 10% to less than 15% of the inner diameter of the floor-engaging rim.

15. The injection-blow-molded nursing bottle as defined in claim 1 wherein the barrel is defined by a surrounding wall extending continuously to define the closed bottom and the surrounding wall has a substantially uniform thickness over substantially the entire extent of the surrounding wall.

\* \* \* \* \*